US012758470B2

(12) United States Patent
Wheeler

(10) Patent No.: US 12,758,470 B2
(45) **Date of Patent: *Oct. 13, 2026**

(54) PILL POUCH

(71) Applicant: Todd Wheeler, Gilbert, SC (US)

(72) Inventor: Todd Wheeler, Gilbert, SC (US)

( * ) Notice: Subject to any disclaimer, the term of this patent is extended or adjusted under 35 U.S.C. 154(b) by 166 days.

This patent is subject to a terminal disclaimer.

(21) Appl. No.: 18/649,877

(22) Filed: Apr. 29, 2024

(65) Prior Publication Data

US 2024/0350367 A1 Oct. 24, 2024

Related U.S. Application Data

(63) Continuation of application No. 18/094,004, filed on Jan. 6, 2023, now abandoned, which is a continuation of application No. 17/410,929, filed on Aug. 24, 2021, now abandoned, which is a continuation of application No. 14/937,813, filed on Nov. 10, 2015, now Pat. No. 11,096,868, which is a continuation-in-part of application No. 14/462,180, filed on Aug. 18, 2014, now Pat. No. 9,180,071.

(60) Provisional application No. 61/976,308, filed on Apr. 7, 2014, provisional application No. 61/869,933, filed on Aug. 26, 2013.

(51) Int. Cl.
*A61J 7/00* (2006.01)
*A61J 1/10* (2006.01)
*A61J 1/14* (2023.01)

(52) U.S. Cl.
CPC ............... *A61J 7/0007* (2013.01); *A61J 1/10* (2013.01); *A61J 1/1487* (2015.05)

(58) Field of Classification Search
CPC ........... A61J 7/0007; A61J 1/10; A61J 1/1487
USPC .......................................................... 206/571
See application file for complete search history.

(56) References Cited

U.S. PATENT DOCUMENTS 497,543 A * 5/1893 Henderson ................ E04C 3/22 52/223.9
3,131,651 A * 5/1964 Kelner ................... A21B 3/135 100/103
3,915,393 A * 10/1975 Elkins ................... A61J 7/0007 241/168
4,474,559 A * 10/1984 Steiger ............... G09B 19/0092 434/268
5,823,451 A * 10/1998 Sharpe .................. A61J 7/0007 241/DIG. 27
5,915,637 A * 6/1999 Parsons ................. A61J 7/0007 241/168
6,059,209 A * 5/2000 Barson .................. A61J 7/0007 241/168
6,259,209 B1 * 7/2001 Bhardwaj ................ H05H 1/46 315/111.41
6,637,685 B1 * 10/2003 Kruger .................. A61J 7/0007 241/DIG. 27

(Continued)

*Primary Examiner* — Peter N Helvey
(74) *Attorney, Agent, or Firm* — Thorpe North & Western, LLP.; David W. Osborne

(57) ABSTRACT

A pill pouch is disclosed. The pill pouch can include a receptacle to contain a pill. The receptacle can have an opening to receive the pill therein. The receptacle can be defined at least in part by a flexible side to facilitate breaking or crushing of the pill inside the receptacle. The pill pouch can also include an access feature associated with the receptacle to facilitate removal of the pill from the receptacle after the pill has been broken and/or crushed.

4 Claims, 12 Drawing Sheets

(56) References Cited

U.S. PATENT DOCUMENTS

D497,543 S * 10/2004 Buckley .................... D9/703
7,032,851 B2 * 4/2006 Demske .................... B02C 4/02 241/DIG. 27
7,051,963 B1 * 5/2006 Buckley .................... A61J 7/0007 241/169
D528,781 S * 9/2006 Leyshon .................... D3/203.2
7,175,615 B2 * 2/2007 Hanly .................... A61M 5/162 383/41
7,364,102 B2 * 4/2008 Engel .................... A61J 7/0007 241/DIG. 27
7,407,124 B1 * 8/2008 Layshon .................... A61J 7/0007 241/DIG. 27
7,559,496 B2 * 7/2009 Shewchuk .................... A61J 7/0007 241/DIG. 27
7,562,790 B2 * 7/2009 Wheeler .................... A61J 7/0076 221/256
7,637,449 B1 * 12/2009 Leyshon .................... A61J 7/0007 241/301
D699,588 S * 2/2014 Yang .................... D9/703
D741,724 S * 10/2015 He .................... D9/703
2003/0231808 A1 * 12/2003 Machacek .................... B65D 33/2508 383/906
2005/0078888 A1 * 4/2005 Taheri .................... B65D 33/004 383/105
2005/0288638 A1 * 12/2005 Michel, III .................... A61M 5/36 604/80
2007/0164141 A1 * 7/2007 Engel .................... A61J 7/0007 241/169.2
2008/0093490 A1 * 4/2008 Donovan .................... A61J 7/0007 241/169.2
2008/0254471 A1 * 10/2008 Bordano .................... A61B 10/02 435/6.1
2012/0041416 A1 * 2/2012 Lal .................... A61M 5/14 604/246
2012/0312906 A1 * 12/2012 Dow .................... A61J 7/0007 220/4.24
2013/0202228 A1 * 8/2013 Murray .................... B65D 33/16 383/42
2013/0248386 A1 * 9/2013 Benoit .................... B65D 31/147 206/205
2014/0306048 A1 * 10/2014 He .................... B02C 1/00 241/169.2
2015/0183555 A1 * 7/2015 Mitsui .................... B32B 27/34 383/10
2015/0225131 A1 * 8/2015 Gewirtz .................... A61J 15/0069 53/469
2016/0022544 A1 * 1/2016 Turner .................... A61M 39/1011 604/533
2024/0350360 A1 * 10/2024 Karlovsky .................... A61J 1/05
2024/0350368 A1 * 10/2024 Oike .................... B65G 47/1457
2024/0351043 A1 * 10/2024 Schmidt .................... B01L 7/00
2024/0374801 A1 * 11/2024 Yuan .................... A61J 1/10

* cited by examiner

PILL POUCH

RELATED APPLICATIONS

This application is a continuation of U.S. patent application Ser. No. 18/094,004, filed Jan. 6, 2023, which is a continuation of U.S. patent application Ser. No. 17/410,929, filed Aug. 24, 2021, which is a continuation of U.S. patent application Ser. No. 14/937,813, filed Nov. 10, 2015, now issued as U.S. Pat. No. 11,096,868, which is a continuation in part of U.S. patent application Ser. No. 14/462,180, filed Aug. 18, 2014, now issued as U.S. Pat. No. 9,180,071, which claims the benefit of U.S. Provisional Patent Application Ser. Nos. 61/869,933, filed on Aug. 26, 2013, and 61/976,308, filed on Apr. 7, 2014, each of which is incorporated herein by reference.

BACKGROUND

Medications are administered in a variety of forms. Although a liquid preparation may be desirable in some situations, for some drugs a liquid preparation may not be available. It can therefore be necessary to administer a solid dosage form, such as a pill or tablet. In some situations, however, a medication must be administered via a feeding tube. In this case, a pill or tablet can be crushed or reduced to a fine powder to facilitate administering the pill or tablet through a tube. For many years a simple mortar and pestle tool has been used to crush and grind pills for such purposes. Although there have been advancements in pill crushing technology, current pill crushers typically rely on a crushing action to reduce pills to smaller particles.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
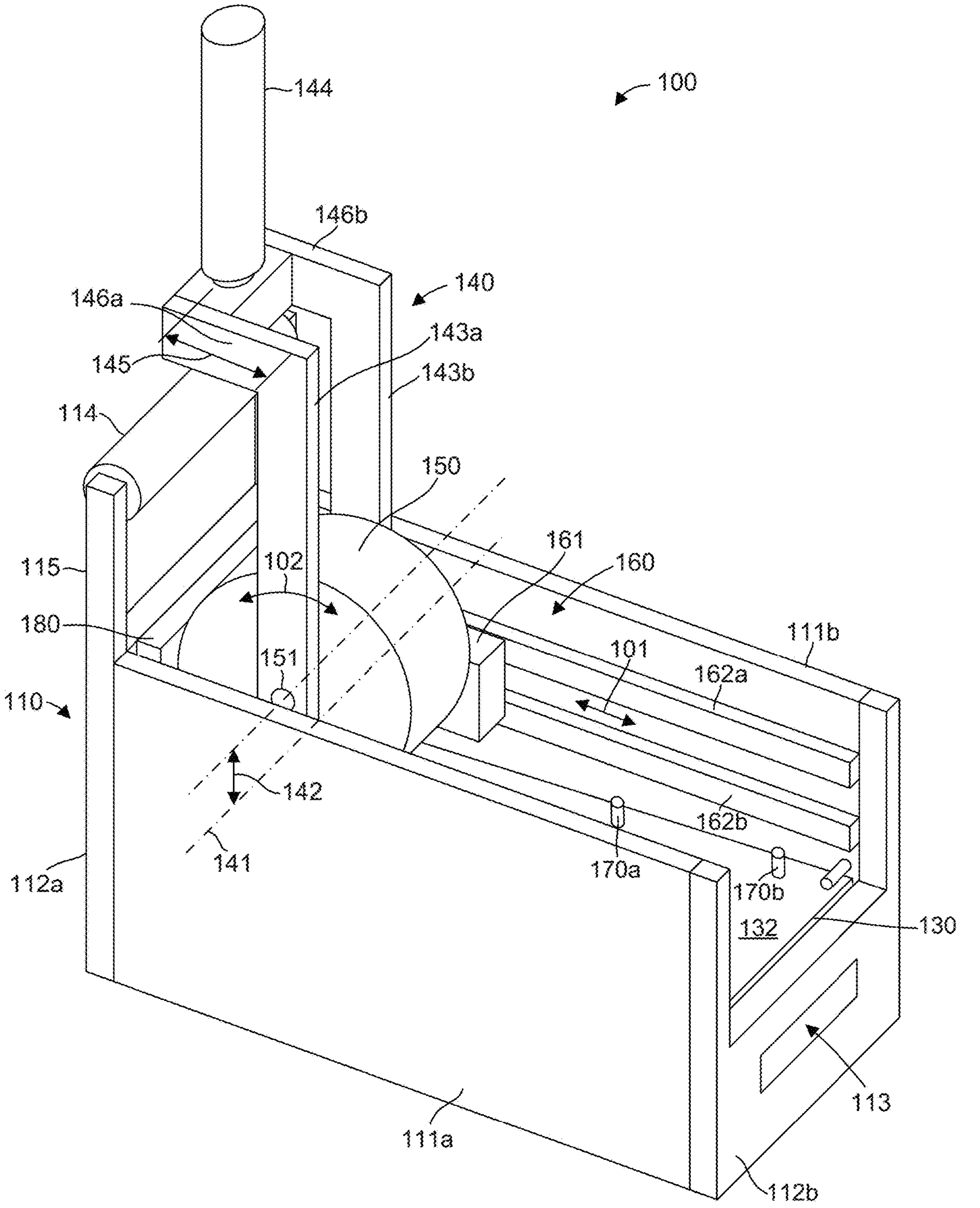
FIG. 1 is an example illustration of a pill preparation device in accordance with an embodiment of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Use of a typical pill crusher can lead to fine dust becoming airborne or remaining on the device after use, which can lead to cross-contamination of various medications and also pose a risk to the patient and practitioner. Thus, potential risk to patients can be reduced by minimizing the occurrence of tube occlusions and further eliminating or minimizing cross-contamination and unintended inhalation of medications by facilitating a closed pill preparation and delivery system.

Accordingly, a pill pouch is disclosed that can minimize or reduce pill or medication dust escaping and becoming airborne, which can also minimize or reduce inhalation by hospital personnel and/or other bystanders, such as patients or visitors. In one aspect, the potential for cross-contamination of medications can be minimized by the pill pouch. The pill pouch can include a receptacle to contain a pill. The receptacle can have an opening to receive the pill therein. The receptacle can be defined at least in part by a flexible side to facilitate breaking or crushing of the pill inside the receptacle. The pill pouch can also include an access feature associated with the receptacle to facilitate removal of the pill from the receptacle after the pill has been broken and/or crushed.

In one aspect, a pill pouch is disclosed that can include a receptacle to contain a pill. The receptacle can have an opening to receive the pill therein. The receptacle can be defined at least in part by a flexible side to facilitate breaking or crushing of the pill inside the receptacle. The pill pouch can also include a sealing mechanism operable to alternately seal the opening and provide access to the receptacle through the opening. The sealing mechanism can have a groove and ridge configured to releasably interlock with one another. In addition, the pill pouch can include an access feature associated with the receptacle to facilitate removal of the pill from the receptacle after the pill has been broken and/or crushed. The access feature can be oriented such that a longitudinal axis of the access feature extends parallel to the flexible side.

In one aspect, a pill pouch system is disclosed. The system can comprise a pill pouch including a receptacle to contain a pill. The receptacle can have an opening to receive the pill therein. The pill pouch can also include an access feature to facilitate removal of the pill from the receptacle after the pill has been broken and/or crushed. Additionally, the system can comprise an extraction instrument coupleable to the access feature to remove the pill from the receptacle.

One embodiment of a pill preparation device 100 is illustrated in FIG. 1. The pill preparation device 100 can comprise a base 110, which can be configured to rest on, or be rigidly coupled to, a support surface such as a table, bench, cart, counter, or other support surface. In one aspect, the base 110 can be configured to be mounted on a vertical support surface, such as a wall. The base 110 can include side walls 111*a*, 111*b*, end walls 112*a*, 112*b*, and a bottom (hidden from view). As discussed in more detail hereinafter, the base 110 can be configured to provide structural support for various components and features of the pill preparation device 100. Accordingly, the structures of the base 110, such as the side and end walls 111*a*, 111*b*, 112*a*, 112*b*, can vary in form from that illustrated in the figures. For example, a base can include a structural framework of beams, instead of walls, to provide suitable structural support for the various components and features of a pill preparation device as disclosed herein.

The pill preparation device 100 can also comprise an anvil (hidden from view) supported by the base 110, and a platen 130 coupled to the base 110 and movable relative to the anvil. The platen 130 can have a crushing surface (hidden from view) oriented toward the anvil and a rolling surface 132 on a side opposite the crushing surface. In one aspect, the base 110 can include an opening 113 configured to facilitate disposing a pill between the platen 130 and the anvil. As discussed further hereinafter, a pill can be disposed in a pill pouch, and the opening 113 can be configured to receive the pill pouch in order to locate the pill between the platen 130 and the anvil.

In addition, the pill preparation device 100 can include a lever arm 140 slidably coupled to the base 110 and rotatable about a pivot (represented by axis 141). A roller 150 can be coupled to the lever arm 140 and offset 142 from the pivot such that the lever arm 140 is operable to selectively position the roller 150 about the platen 130, such as by translational and/or rotational movement in directions 101 and 102, respectively. In one aspect, the lever arm 140 can be slidably coupled to the base 110 via a sliding mechanism 160. The sliding mechanism 160 can include a carriage 161 that is translatable along a track 162*a*, 162*b*. The lever arm 140 can be pivotally coupled to the carriage 161 and movable along the track 162*a*, 162*b* to position the roller 150 at a desired location relative to the platen 130. The sliding mechanism 160 can be configured to facilitate sliding or translational movement in any suitable manner. For example, in one aspect, the carriage 161 and/or the track 162*a*, 162*b* can include a roller, bearing, wheel, or other device or feature to facilitate sliding or translational movement.

The lever arm 140 can include extension members 143*a*, 143*b* disposed on opposite sides of the roller 150. The extension members 143*a*, 143*b* can be configured to rotatably couple with the carriage 161 and pivot about the axis 141. In one aspect, the lever arm 140, such as the extension members 143*a*, 143*b*, can be rotatably coupled to the carriage 161 via a bearing, bushing, or other suitable device or feature. The extension members 143*a*, 143*b* can also couple with and support the roller 150, such via an axle 151 of the roller 150. The roller 150 can include a bearing, bushing, or other suitable device or feature to facilitate rotational movement of the roller 150 relative to the lever arm 140.

The lever arm 140 can also include a handle 144 to facilitate maneuvering the lever arm 140, and thus the roller 150, by a user. The handle can comprise a grip enhancing feature or material to enable the user to effectively grip the lever arm 140. In one aspect, the lever arm 140 can be configured to locate the handle 144 in a position that prevents interference between the user's hand and the base 110, platen 130, or other feature of the pill preparation device 100 during use, which can minimize risk of injury to the user. For example, the handle can be offset 145, such as by offsetting portion 146*a*, 146*b*, from a longitudinal axis of the extension members 143*a*, 143*b* to shift the handle 144 away from a potential interference between the user's hand and a component or feature of the pill preparation device 100.

In one aspect, the pill preparation device 100 can include a pill pouch attachment feature 170*a*, 170*b*. As discussed in more detail hereinafter, a pill pouch containing a pill can be disposed between the roller 150 and the rolling surface 132 of the platen 130. The pill pouch attachment feature 170*a*, 170*b* can be configured to secure or couple the pill pouch to the platen 130 and properly position the pill about the rolling surface 132 to be broken up by the roller 150 and the rolling surface 132. In one aspect, the pill pouch attachment feature 170*a*, 170*b* can comprise a protrusion to be received within a hole of the pill pouch.

The pill preparation device 100 can also include a handle 114 coupled to the base 110 to facilitate stabilizing the pill preparation device 110 by a user during use. The handle 114 can comprise a grip enhancing feature or material to enable the user to effectively grip the handle 114 to stabilize the pill preparation device 100. The handle 114 can be positioned by a support arm 115 extending from the base 110.

In one aspect, the pill preparation device 100 can include a lever arm securing mechanism to maintain the lever arm 140 in a stowed position, as shown in FIG. 1, until further use. In one embodiment, the lever arm 140 can be configured to have an interference with the handle 114 when in the stowed position, which can serve to maintain the lever arm 140 in the stowed position. For example, the offsetting portions 146*a*, 146*b* can be configured to contact the handle 114 when in the lever arm 140 is in the stowed position, which can cause the handle 114 constructed of a resilient material, such as an elastomer, to compress due to the interference and hold the lever arm 140 in the stowed position until further use. In another embodiment, the pill preparation device 100 can include a magnet 154 to act on the roller 150 or the lever arm 140 itself in order to maintain the lever arm 140 in the stowed position.

Figure 2A:
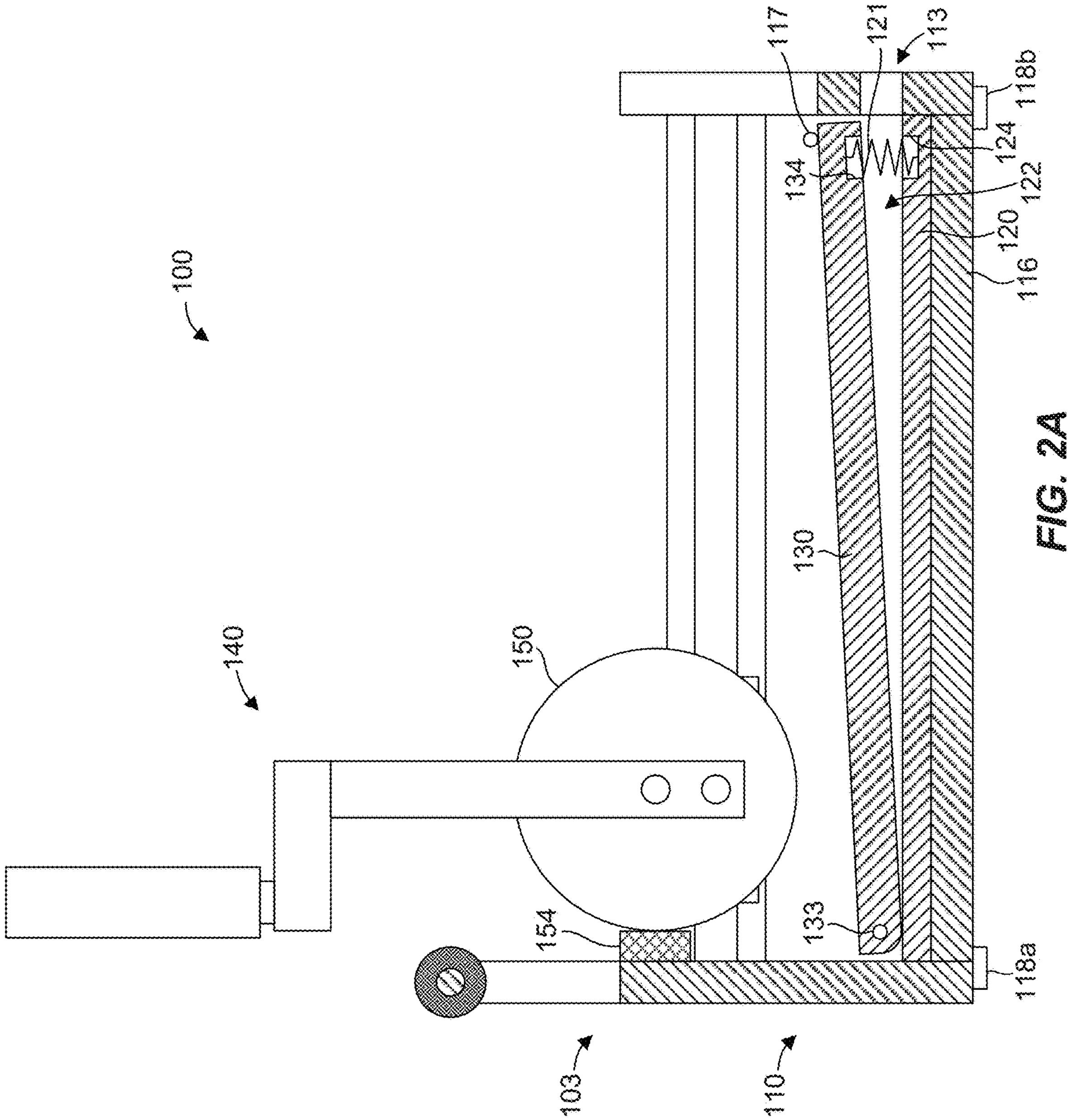
FIGS. 2A-2D are side cross-sectional schematic views of the pill preparation device of FIG. 1.

FIGS. 2A-2D illustrate side cross-sectional schematic views of the pill preparation device 100 to show features hidden from view in FIG. 1 and to demonstrate operation of the pill preparation device 100. Certain features have been omitted from these views for clarity. As shown in FIG. 2A, the pill preparation device 100 has the lever arm 140 in the stowed position illustrated in FIG. 1, with the magnet 154 acting on the roller 150 to maintain the lever arm 140 in the stowed position at an end 103 of the pill preparation device 100. The anvil 120 can be seen adjacent the bottom 116 of the base 110. The platen 130 is supported by the base 110 and movable relative to the anvil 120, in this case by a pivot 133 that provides for movement in a rotational degree of freedom. The platen 130 can be biased away from the anvil 120 by a spring 121, which can have ends disposed in countersunk holes 124, 134 in the anvil 120 and the platen 130, respectively. The space provided by the countersunk holes 124, 134 can accommodate the spring 121 when compressed to provide a range of motion of the platen 130 that permits the platen 130 to press against the anvil 120. It should be recognized that the platen 130 can be biased away from the platen 120 by any suitable biasing mechanism, such as a torsion spring associated with the pivot 133, for example. A stop 117 can limit the range of motion of the platen 130 away from the anvil 120 and can therefore be configured to resist the biasing force acting on the platen 130. Biasing the platen 130 away from the anvil 120 can provide a space 122 between the platen 130 and the anvil 120, which can facilitate disposing a pill between these two components, such as via the opening 113 in the base 110.

The base 110 can also include features, such as feet 118*a*, 118*b*, to interface with a support surface. The feet 118*a*, 118*b* can comprise surface features and/or a material that enhances grip between the pill preparation device 100 and the support surface to prevent unwanted movement of the pill preparation device 100 relative to the support surface during use.

Figure 2B:
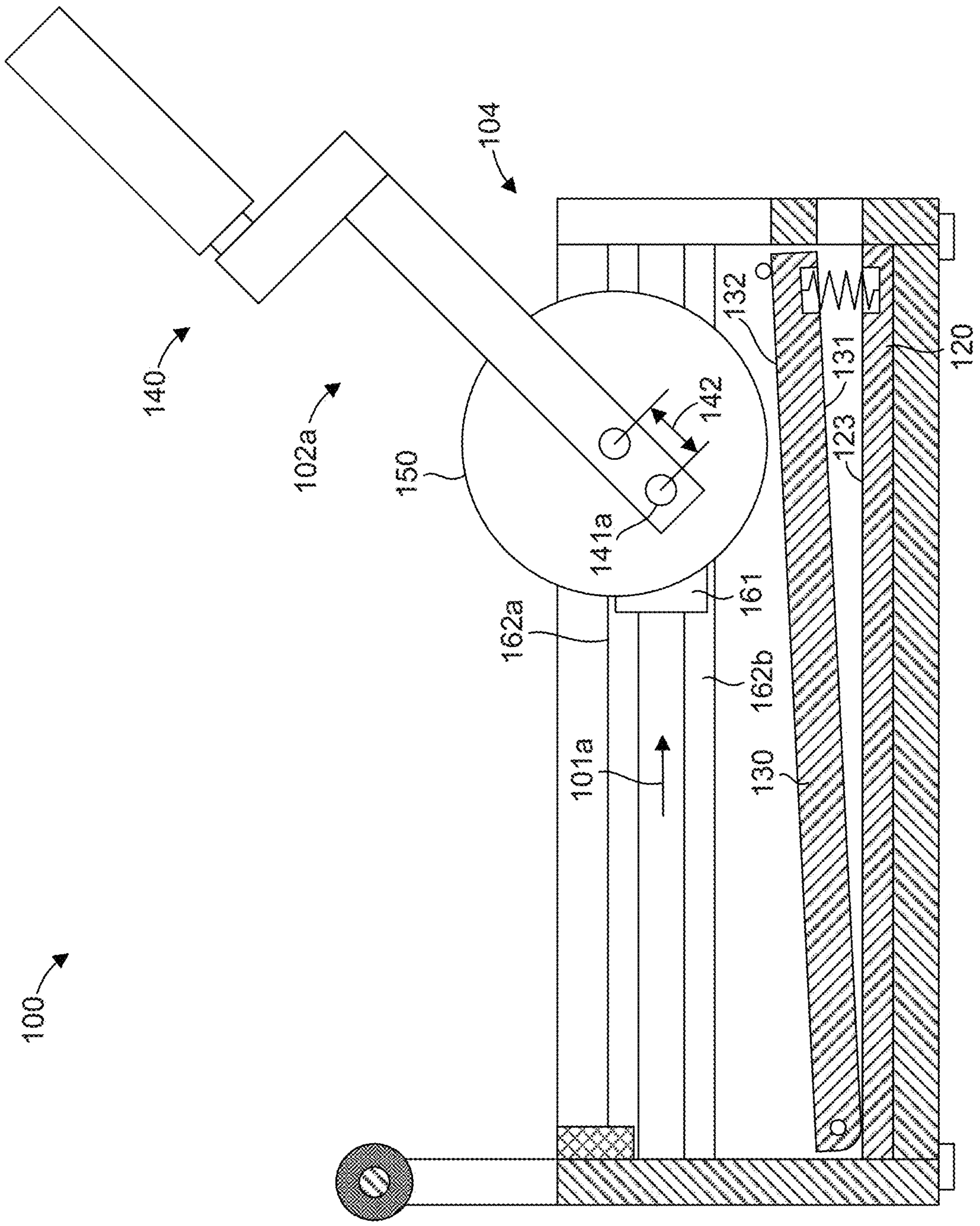
Figure 2C:
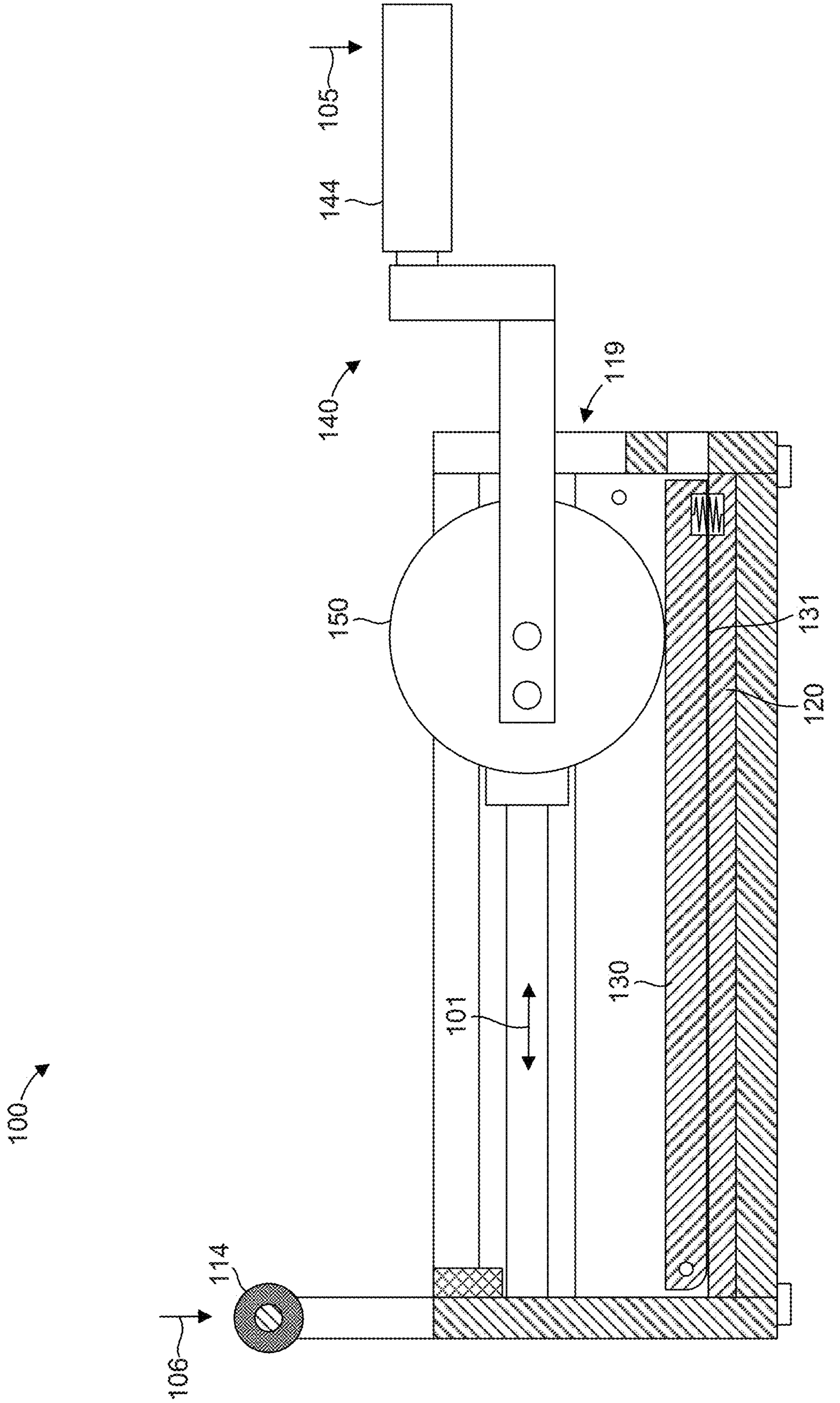

FIG. 2B illustrates the lever arm 140 moved in direction 101*a* via the carriage 161 along the tracks 162*a*, 162*b* from the stowed position toward an end 104 of the pill preparation device 100. In one aspect, the lever arm 130 can be slidable in a translational degree of freedom parallel to a working surface 123 of the anvil 120. Such movement of the lever arm 140 can locate the roller 150 over the platen 130 in preparation to break up a pill disposed between the crushing surface 131 of the platen 130 and the anvil 120, and/or on the rolling surface 132 of the platen 130. For example, when the lever arm 140 is rotated in direction 102*a* about the pivot 141*a*, the roller 150, which has a center of rotation that is offset 142 from the pivot 141*a*, can be moved toward the platen 130. As shown in FIG. 2C, a force 105 applied to the lever arm 140 tending to cause movement of the roller 150 toward the platen 130 can force the platen 130 toward the anvil 120 to facilitate breaking up a pill disposed between the crushing surface 131 and the anvil 120. The location of the lever arm 140 and the roller 150 relative to the platen 130 can be adjusted in direction 101 as desired to provide an advantageous leverage when crushing a pill between the platen 130 and the anvil 120. In one aspect, the offset 142 and/or the length of the lever arm 140 can be configured to provide adequate leverage for crushing and/or rolling a pill as disclosed herein. In another aspect, the crushing surface 131 of the platen 130 and/or the working surface 123 of the anvil 120 can include surface features, such as textures, to facilitate breaking up a pill.

The base 110 can also include an opening 119 configured to accommodate the lever arm 140 when rotated to cause the roller 150 to move toward the platen 130. The downward force 105 applied by a user to the handle 144 of the lever arm 140 can cause the end 103 of the pill preparation device 100 to lift up off of a supporting surface, which can create instability when using the pill preparation device 100. Accordingly, the user can provide a downward force 106 on the handle 114 to prevent such an instable condition from occurring.

Figure 2D:
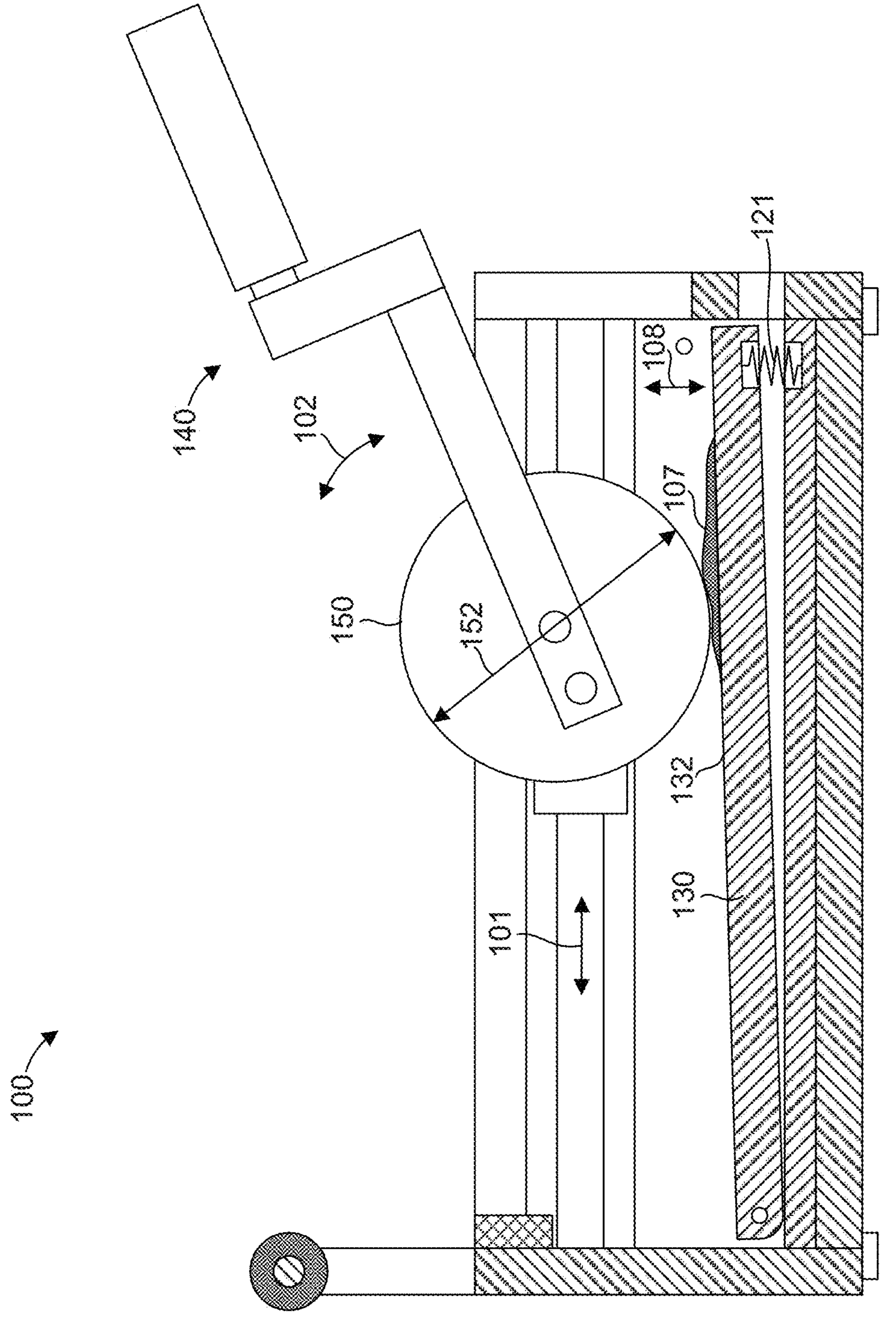

FIG. 2D illustrates operation of the pill preparation device 100 when breaking up a pill disposed on the rolling surface 132 of the platen 130. In general, executing a crushing operation on a pill, such as between the platen 130 and the anvil 120, is useful to break up the pill into small chunks, but it is insufficient to break up the pill into a powder form that can be readily administered to a patient via a tube, such as a feeding or IV tube. In addition, performing a rolling operation on a pill can generally be effective to break up a pill into smaller pieces than is possible with a crushing operation, even to the extent of rendering the pill in a fine powder form following the rolling operation. Thus, one benefit of the pill preparation devices of the present disclosure is the ability to not only break up a pill by crushing, but to also provide the ability to break up a pill by rolling to achieve a fine powdered form of the pill that can be readily administered through a tube without clogging.

For example, movement of the lever arm 140, such as in translational direction 101 and in rotational direction 102, can cause movement of the roller 150 to facilitate breaking up a pill 107 disposed between the roller 150 and the rolling surface 132. The lever arm 140 can be actively maneuvered back-and-forth and up-and-down to produce a desired rolling effect on the pill 107 until the pill 107 has been converted into a suitable consistency, such as a powder. A diameter 152 of the roller 150 can be selected to facilitate rolling over the pill 107, with a larger diameter generally being more effective at overcoming chunks or other pill fragments than a smaller diameter. In one aspect, the platen 130 can be biased toward the roller 150, such as by the spring 121. This can cause the platen 130 to move in direction 108 as the roller 150 rolls over the pill 107. For example, the platen 130 can provide some “give” away from the roller 150 as the roller 150 moves against the pill 107, which can facilitate rolling over the pill 107 when the roller 150 may otherwise be stopped or have difficulty in rolling over the pill 107. Once a chunk or pill fragment has been overcome by the roller 150, the spring 121 can rebound to maintain the roller 150 in contact with the pill 107. Thus, the spring 121 can be configured to provide a suitable amount of force to facilitate or enhance the rolling operation. This action provided by the spring 121 in conjunction with the selective positioning of roller 150 by the user manipulating the lever arm 140 can facilitate a fast and effective rolling of the pill 107 into a powder. In one aspect, the roller 150 and the rolling surface 132 can be used in a crushing operation, such that the roller 150 is not used to roll but, rather, to simply crush the pill 107. Thus, the roller 150 can be used in any suitable manner to achieve a desired result.

Figure 3:
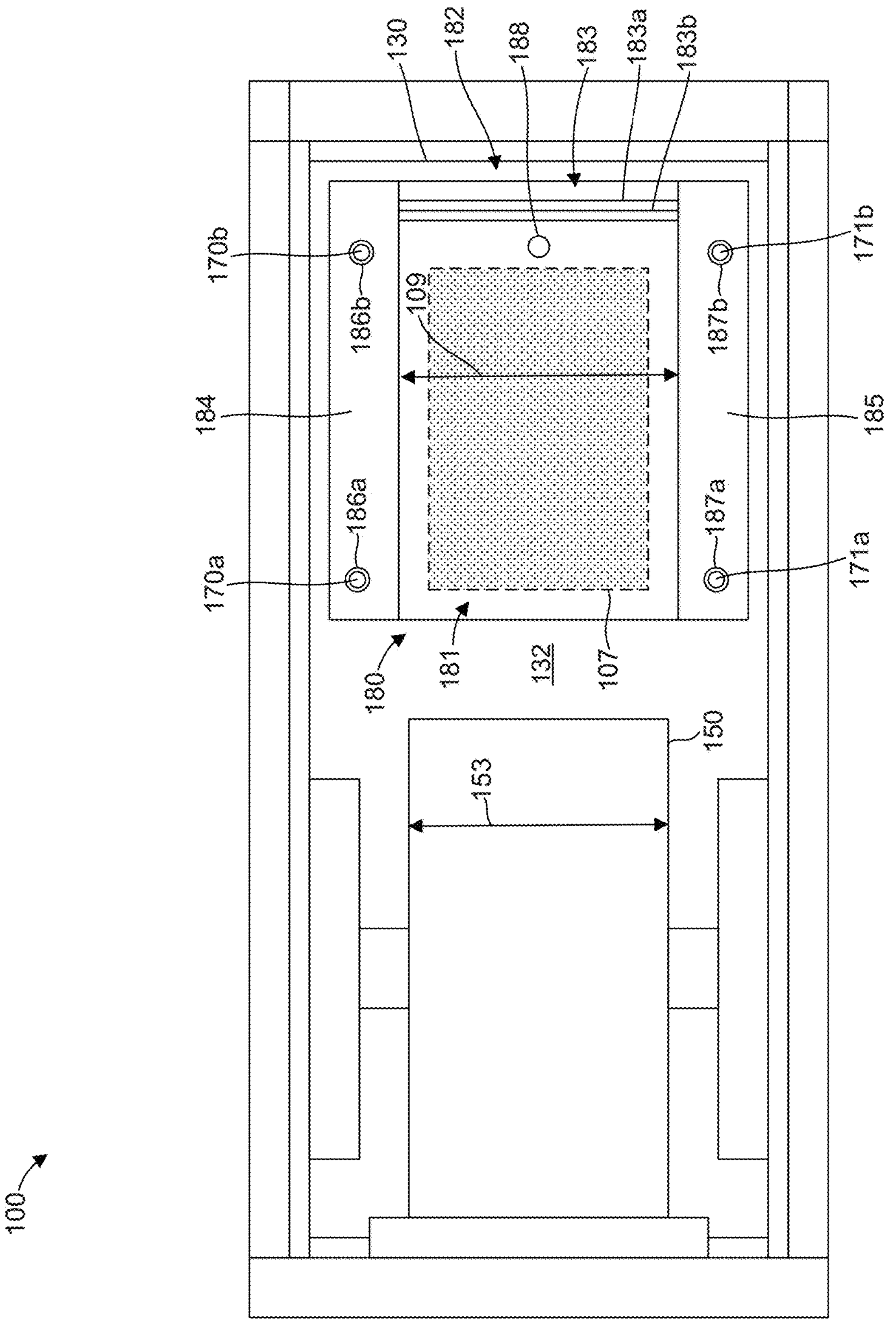
FIG. 3 is a top schematic view of the pill preparation device of FIG. 1.

FIG. 3 illustrates a top schematic view of the pill preparation device 100, with certain features omitted for clarity. Also included in the figure is a pill pouch 180 that can be configured to contain a pill, represented generally by reference number 107 as a plurality pills and/or pill fragments, chunks, and/or powder. In one aspect, the pill preparation device 100 and the pill pouch 180 can form a pill preparation system.

The pill pouch 180 can include a receptacle 181 to contain the pill 107. The receptacle 181 can comprise any suitable configuration, such as a rectangular configuration illustrated in the figure. The receptacle 181 can have an opening 182 to receive the pill 107 into the receptacle 181 as well as to dispense the pill 107 from the receptacle 181. A closure or sealing mechanism 183 can be operable to alternately seal the opening 182 and provide access to the receptacle 181 through the opening 182. In one aspect, the closure or sealing mechanism 183 can have a groove 183*a* and ridge 183*b* configured to releasably interlock with one another. The groove 183*a* and ridge 183*b* can be similar to those of the closure or sealing mechanisms commonly utilized with resealable zipper bags, such as Ziploc® bags. Any suitable number of grooves and ridges can be utilized in any suitable combination. In another aspect, the opening 182 can be sealed, such as with heat, to form a temporary or permanent seal.

The pill pouch 180 can also include a tab 184 disposed on a side of the receptacle 181, and a tab 185 disposed on an opposite side of the receptacle 181. Each tab 184, 185 can be configured to interface and/or couple with the pill preparation device 100, such as via pill pouch attachment feature 170*a*, 170*b*, 171*a*, 171*b*. For example, each tab 184, 185 can have a hole 186*a*, 186*b* and 187*a*, 187*b*, respectively, to facilitate coupling with the pill preparation device 100. In this case, the protrusions of the pill pouch attachment features 170*a*, 170*b* can extend through holes 186*a*, 186*b* of the tab 184, respectively, and the protrusions of the pill pouch attachment features 171*a*, 171*b* can extend through or engage with holes 187*a*, 187*b* of the tab 185, respectively. In one aspect, the pill pouch attachment features 170*a*, 170*b*, 171*a*, 171*b* can include a barb or hook to maintain engagement with the respective holes 186*a*, 186*b* and 187*a*, 187*b* of the pill pouch 180. In one embodiment, a pill pouch attachment feature can comprise a sharp tip to pierce a tab of a pill pouch. In this case, the tab can be devoid of a hole, as one is formed by the sharp tip upon penetration of the tab.

The pill pouch attachment features 186*a*, 186*b*, 187*a*, 187*b* can be located on the platen 130 such that there will be no interference with the roller 150 as the roller 150 is manipulated about the platen 130 during use. Thus, the pill pouch attachment features 186*a*, 186*b*, 187*a*, 187*b* can be associated with the platen 130 in a manner that facilitates maintaining a position of the pill pouch 180 on the rolling surface 132 during use without interfering or inhibiting the operation of the roller 150 to break up a pill. In one aspect, a width 109 of the receptacle 181 can be roughly the same size as a width 153 of the roller 150, which can maintain the pill 107 in a position to be broken up by the roller 150. Thus, the configuration of the pill pouch attachment features 186*a*, 186*b*, 187*a*, 187*b*, the tabs 184, 185, and the receptacle 181 can serve to position the pill 107 on the rolling surface 132 of the platen 130 to facilitate breaking up the pill 107 by the roller 150.

As described in more detail hereinafter, the pill pouch 180 can include an access feature 188, which can provide an opening to the receptacle 181. In one aspect, the access feature 188 can facilitate placement of the pill into the receptacle and/or removal of the pill 107 from the receptacle 181 after the pill has been broken or crushed by the pill preparation device 100. The access feature 188 can comprise a hole, a port, a slit, a breakable membrane, a luer connector, and/or any other suitable access feature. For example, the access feature 188 can be configured to facilitate removal of the pill 107 from the receptacle 181 using an extraction instrument, such as a syringe, a tube, a nozzle, a hypodermic needle, a hollow needle, and/or any other suitable device or mechanism for removing the pill from the receptacle, whether in a dry or a liquid solution form.

Thus, in one aspect, the access feature 188 can facilitate the removal of air from the pill pouch 180 once a pill has been deposited in the receptacle 181 and the opening 182 has been closed to prevent the pill pouch from rupturing due to internal pressure develop while crushing and/or rolling the pill. Air can be removed through the access feature 188 using a syringe, for example. In some cases, the syringe may remain with the pill pouch 180 throughout the crushing and/or rolling process and out of the path of the roller 150, platen 130, and/or anvil 120. In other cases, the syringe may be removed and the access feature can be sealed to prevent air from entering the pill pouch 180. After the pill 107 has been sufficiently crushed and/or rolled, a liquid can be introduced into the receptacle via the access feature 188, such as using a syringe, to form a liquid pill solution, which may be facilitated by shaking the pill pouch 180 to mix the contents. A solution can include particles in suspension and does not require that all materials are solubilized within a liquid vehicle. A liquid or liquid vehicle can be any type of pharmaceutically acceptable liquid known in the art. Once the liquid pill solution has been formed, the solution can be removed, withdrawn, or evacuated from the pill pouch 180 via the access feature 188 using an extraction instrument, such as a syringe. The liquid pill solution can be delivered directly to a patient from the extraction instrument, such as by depositing the solution from a syringe into a feeding tube. Thus, a closed pill preparation and delivery system can be facilitated by the pill pouch 180 that minimizes or reduces pill or medication dust escaping the pill pouch 180, which can also minimize or reduce inhalation by hospital personnel and/or other bystanders, such as patients or visitors.

It should be recognized that the access feature 188 can be located or disposed at any suitable location about the pill pouch 180 and/or relative to the receptacle 181. In one aspect, the access feature 188 can be located to facilitate access to all portions of the receptacle 181, such as a corner, to facilitate removal of the pill 107 from the receptacle 181 following crushing and/or rolling of the pill using an extraction instrument, such as a syringe, whether in a dry or a liquid solution form. In another aspect, the access feature 188 can be located to position the extraction instrument such that the extraction instrument will not interfere with crushing and/or rolling operations of the pill preparation device 100 when the extraction instrument is coupled with the pill pouch 180 during a crushing and/or rolling operation. Thus, the access feature 188 can be located at one end of the pill pouch 180, as shown in FIG. 3. In a particular aspect, the access feature 188 can be located substantially on a longitudinal axis of the pill pouch 180 (as shown in the figure), or off-axis, such as proximate a corner of the receptacle 181.

Figure 4:
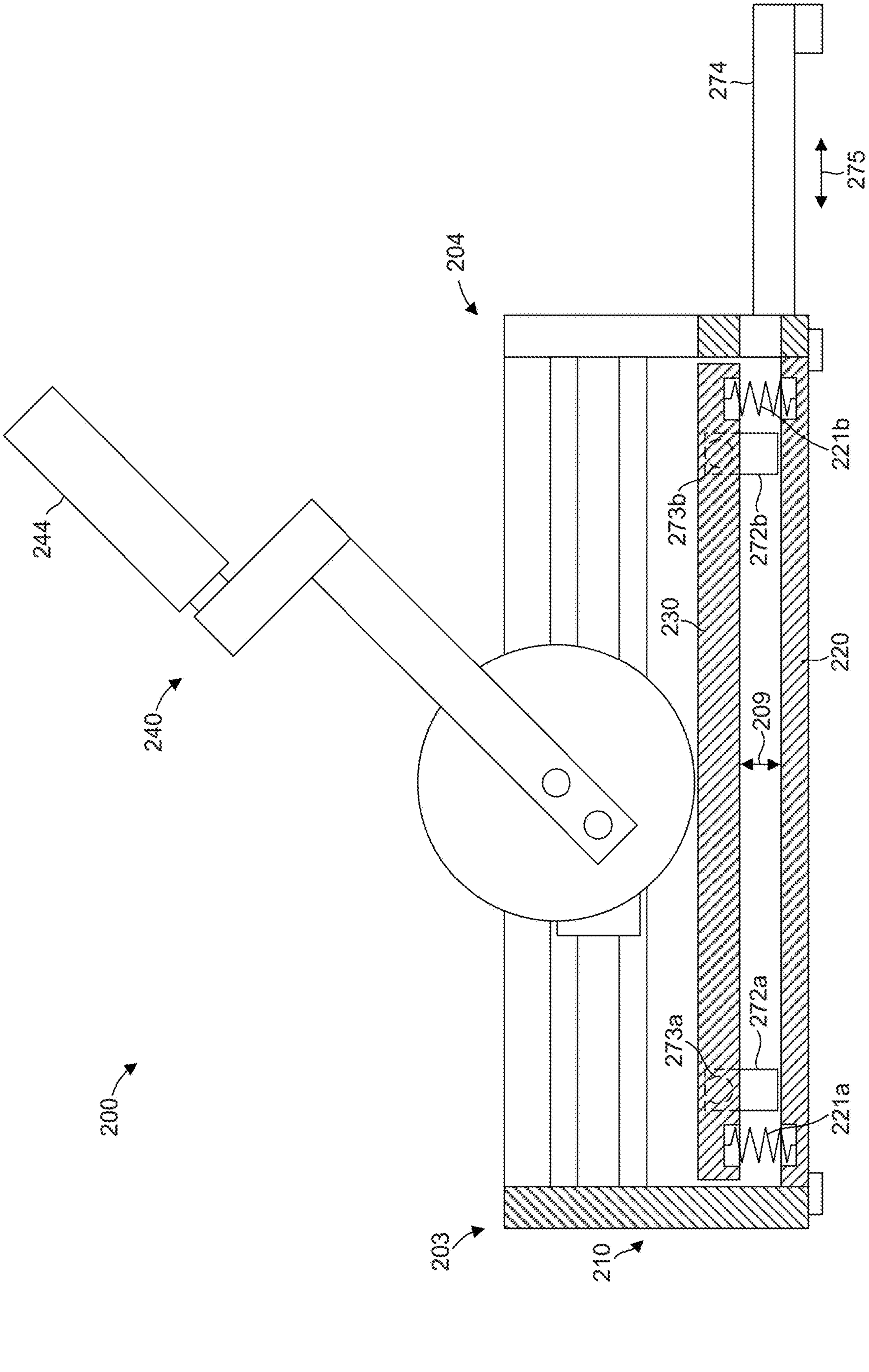
FIG. 4 is an example illustration of a pill preparation device in accordance with another embodiment of the present disclosure.

FIG. 4 illustrates another embodiment of a pill preparation device 200 in accordance with the present disclosure. The pill preparation device 200 is similar in many respects to the pill preparation device 100 illustrated in FIGS. 1-3. The pill preparation device 200, however, illustrates a platen 230 that is movable relative to an anvil 220 in direction 209, which represents a translational degree of freedom. In this case, a base 210 can include a slot 272*a*, 272*b* and the platen 230 can have a protrusion 273*a*, 273*b* configured to move within the slot 272*a*, 272*b*, respectively. In one aspect, the slot 272*a*, 272*b* and the protrusion 273*a*, 273*b* can be configured to constrain movement of the platen to a translational degree of freedom. In another aspect, the slot 272*a*, 272*b* and the protrusion 273*a*, 273*b* can be configured to provide a gap between the slots and the protrusions to facilitate some degree of rotational movement of the platen, as well. The protrusion 273*a*, 273*b* and/or the slot 272*a*, 272*b* can include a bearing, roller, wheel, or any other suitable device or feature to facilitate movement of the protrusion 273*a*, 273*b* within the slot 272*a*, 272*b*. In one aspect, the pill preparation device 200 can also include springs 221*a*, 221*b* configured to bias the platen 230 away from the anvil 220. In this case, the anvil 220 forms a bottom of the pill preparation device 200. In one aspect, the anvil can be integral with the base 210.

The pill preparation device 200 can also include an extension 274 operable with the base 210 to facilitate stabilizing the pill preparation device 200 during use. For example, the extension 274 can be configured to extend from an end 204 of the pill preparation device 200 to resist a downward force applied by a user to a handle 244 of a lever arm 240, which can prevent an end 203 of the pill preparation device 200 from lifting up off of a supporting surface. In one aspect, the extension 274 can be fixed in position relative to the base 210. In another aspect, the extension can be movable relative to the base 210 in direction 275 between a stowed position and an operational position (shown) for use of the pill preparation device 200.

Figure 5:
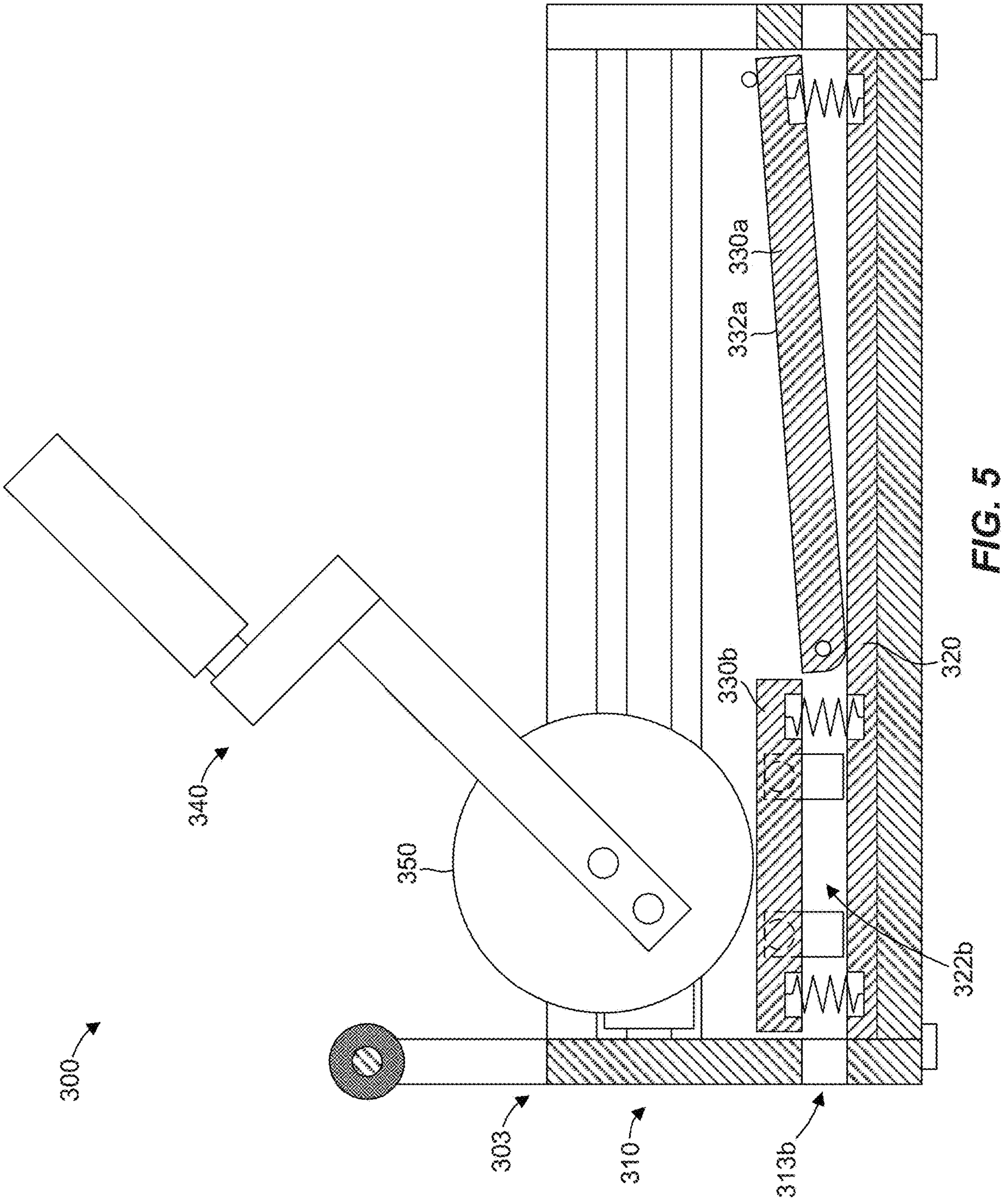
FIG. 5 is an example illustration of a pill preparation device in accordance with yet another embodiment of the present disclosure.

FIG. 5 illustrates yet another embodiment of a pill preparation device 300 in accordance with the present disclosure. The pill preparation device 300 is similar in many respects to the pill preparation devices 100 and 200 illustrated in FIGS. 1-4. The pill preparation device 300, however, includes multiple platens 330*a*, 330*b*. In one aspect, the platens 330*a*, 330*b* can be configured to provide different benefits. For example, the platen 330*a* can function generally as described with respect to the platen 130 of FIGS. 1-3, and the platen 330*b* can function generally as described with respect to platen 230 of FIG. 4. Due to the ability of the platen 330*b* to move vertically, the platen 330*b* can be made relatively short and compact when compared to the platen 330*a* and still provide a suitable space 322*b* between the platen 330*b* and an anvil 320 for receiving a pill through an opening 313*b* in the base 310. In addition, locating the platen 330*b* toward an end 303 of the pill preparation device can provide stability for the device when applying force to a lever arm 340 to break up a pill using the platen 330*b*. Accordingly, the platen 330*b* can be used primarily for crushing a pill between the platen 330*b* and the anvil 320. Once the pill has been sufficiently crushed, the pill can be disposed on the rolling surface 332*a* of the platen 330*a* for a rolling operation with the roller 350, which may require less force than a crushing operation. Thus, the platen 330*a* can be used primarily for rolling operations. However, the platen 330*a* can be used to crush a pill that is relatively easy to crush, without resorting to the platen 330*b*.

Figure 6:
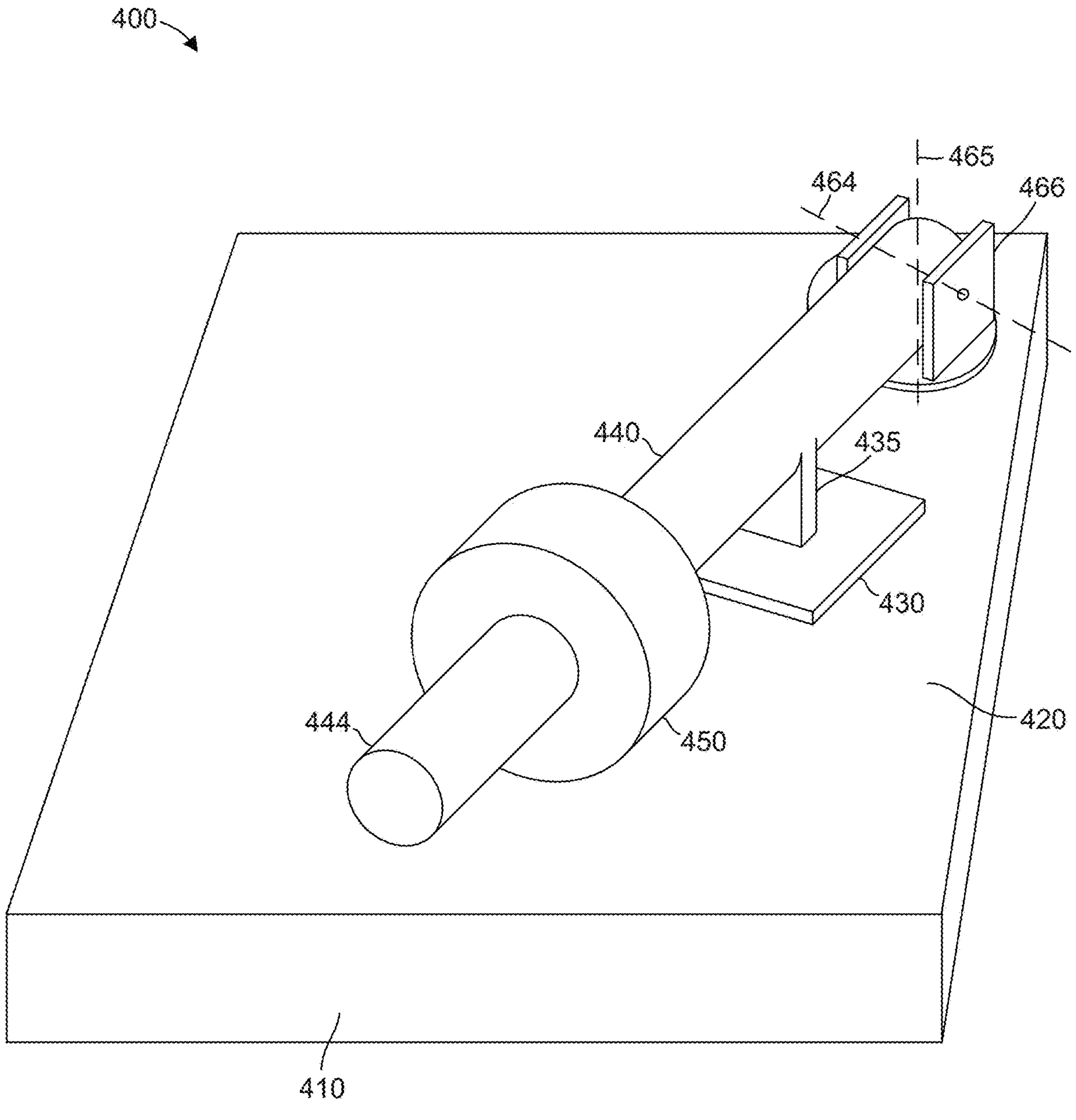
FIG. 6 is an example illustration of a pill preparation device in accordance with still another embodiment of the present disclosure.

FIG. 6 illustrates an additional embodiment of a pill preparation device 400 in accordance with the present disclosure. The pill preparation device 400 can include a base 410, which can have a top portion that serves as an anvil 420. The pill preparation device 400 can also include a lever arm 440 rotatably coupled to the base 410. In one aspect, the lever arm 440 can be rotatable about axes 464, 465 via a coupling member 466. A platen 430 can be coupled to the lever arm 440 and configured to contact the anvil 420 to break up or crush a pill disposed between the platen 430 and the anvil 420, such as by movement of the lever arm 440 about the axis 464. The platen 430 can be coupled to the lever arm by a support member 435. A roller 450 can also be coupled to the lever arm 440 and configured to contact the anvil 420 to roll and/or crush a pill disposed between the roller 450 and the anvil 420, such as by movement about the axes 465, 464. As shown, the roller 450 can be disposed about the lever arm 440, although other configurations are possible. In one aspect, the platen 430 and the roller 450 can be configured to simultaneously contact the anvil 420 to ensure that sufficient crushing and/or rolling force can be applied to a pill on the anvil 420. The lever arm 440 can include a handle 444 to facilitate manipulation of the lever arm 440 by a user. Thus, a pill may be crushed by the platen 430 and the anvil 420 primarily by movement of the lever arm 440 about the axis 464 and rolled by the roller 450 and the anvil 420 primarily by movement of the lever arm 440 about the axis 465. The platen 430 and the roller can therefore be utilized as desired to achieve a suitable consistency of a broken up pill.

Figure 7:
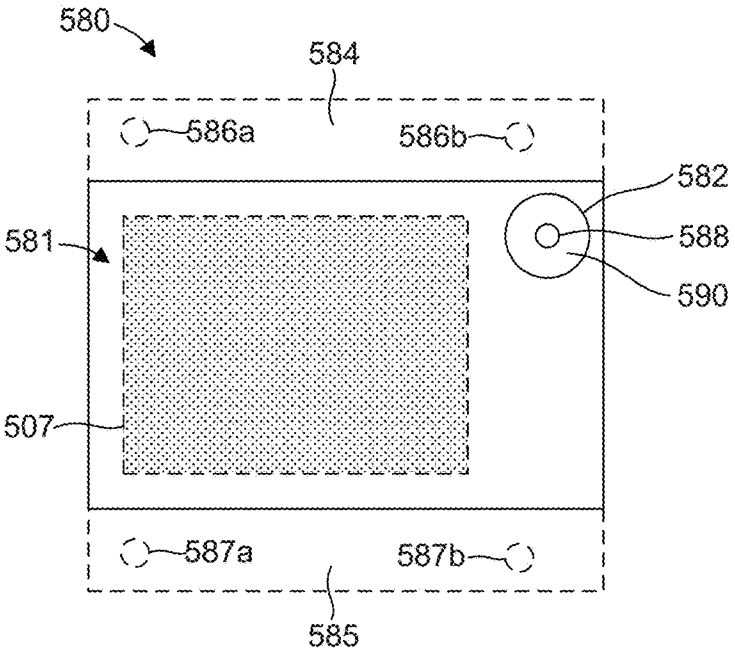
FIG. 7 is an example illustration of a pill pouch in accordance with an embodiment of the present disclosure.

FIG. 7 illustrates a pill pouch 580 in accordance with another example of the present disclosure. The pill pouch 580 is similar in many respects to the pill pouch 180 discussed above with reference to FIG. 3. For example, the pill pouch 580 can include a receptacle 581 to contain a pill, represented generally by reference number 507 as a plurality pills and/or pill fragments, chunks, and/or powder as a result of breaking up and/or crushing of the pill. The pill pouch 580 can also have an opening 582 to receive the pill prior to being crushed and/or broken up into small fragments or powder. The pill pouch 580 can optionally include a tab 584 disposed on a side of the receptacle 581, and a tab 585 disposed on an opposite side of the receptacle 581. Each tab 584, 585 can be configured to interface and/or couple with a pill preparation device, such as via a hole 586*a*, 586*b* and 587*a*, 587*b* interfacing with pill pouch attachment features, as disclosed hereinabove. In addition, the pill pouch 580 can include an access feature 588 to facilitate removal of the pill 507 from the receptacle 581 after the pill has been broken and/or crushed. In this case, the access feature 588 is associated with a cap 590, which is configured to at least partially block passage of material, such as the pill 507, through the opening 582.

It should be recognized that the opening 582 can be located or disposed at any suitable location about the pill pouch 580 and/or relative to the receptacle 581. In one aspect, the opening 582 can be located to facilitate access to all portions of the receptacle 581, such as a corner, to facilitate removal of the pill 507 from the receptacle 581. For example, the opening 582 can be located to position the access feature 588 to facilitate removal of the pill 507 from the receptacle 581 following crushing and/or rolling of the pill using an extraction instrument, such as a syringe, whether in a dry powdered form or as a liquid solution. In another aspect, the opening 582 can be located to position the access feature 588 such that an the extraction instrument will not interfere with crushing and/or rolling operations of a pill preparation device when the extraction instrument is coupled with the pill pouch 580 during a crushing and/or rolling operation. Thus, the opening 582 can be located at one end of the pill pouch 580, as shown in FIG. 7. In a particular aspect, the opening 582 can be located off a longitudinal axis of the pill pouch 580, such as proximate a corner of the receptacle 581, as shown in the figure.

Figure 8:
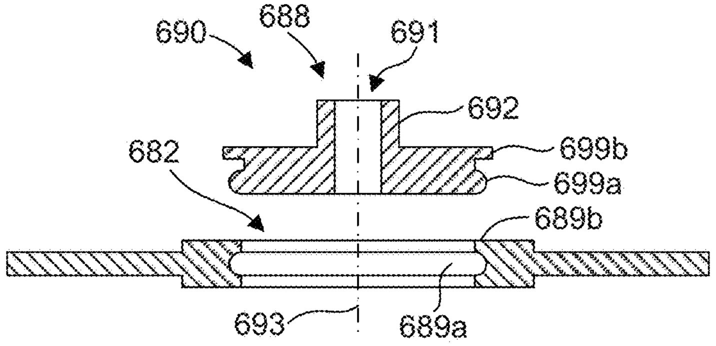
FIG. 8 is a detailed cross-sectional view of a cap and an opening of a pill pouch, in accordance with an embodiment of the present disclosure.

As illustrated in FIG. 8, a cap 690 can include the access feature 688. The access feature 688 can include an opening 691, a hole, a port, a slit, or any other suitable feature to provide a passageway into a receptacle of a pill pouch to facilitate forming and extracting a liquid pill solution, as disclosed hereinabove. In one aspect, the opening 691 can be formed at the time of use by penetrating a thin breakable membrane, such as a thin metal foil or polymer membrane. In addition, the access feature 688 can include a coupling feature 692 configured to couple with an extraction instrument, such as a syringe. Thus, in one aspect, the coupling feature 692 can comprise a luer connector to facilitate coupling with a syringe or other such device.

In addition, the cap 690 can be configured to be disposed in, or over, an opening 682 of a pill pouch. In one aspect, the cap 690 can be configured to couple with features defining the opening 682. For example, the opening 682 can be defined, at least in part, by a coupling feature 689*a* and the cap 690 can include a coupling feature 699*a* to interface with the coupling feature 689*a* of the opening 682 to secure the cap 690 about the opening 682. The coupling features 699*a*, 689*a* can comprise a protrusion and a recess, threaded coupling features, interference fit features, press fit features, snap fit features, and/or any other suitable coupling features. In one aspect, the cap 690 can include a flange or lip 699*b* to interface with a rim 689*b* about the opening 682 to prevent the cap 690 from passing through the opening 682 and into a receptacle of the pill pouch.

Although the cap 690 and the opening 682 can be of any suitable size and/or shape, as shown in the figure, the opening 682 and the cap 690 can interface with one another such that the cap 690 is rotatable relative to the opening 682 about an axis 693.

Figure 9:
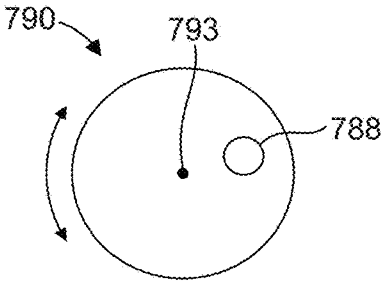
FIG. 9 is a top view of a cap of a pill pouch, in accordance with another embodiment of the present disclosure.

FIG. 9 illustrates one advantage of such a configuration. For example, an access feature 788 associated with a cap 790 can be eccentrically located relative to a rotational axis 793 of the cap 790 relative to an opening of a pill pouch. In one aspect, the rotatable and eccentrically located access feature 788 can facilitate removal of a pill or liquid pill solution via an extraction instrument extending through the access feature into the receptacle. For example, the access feature 788 can be positionable via rotation of the cap 790 to position the extraction instrument to reach portions of a crushed or broken pill or liquid pill solution that may be located in a corner of the pill pouch that may otherwise be inaccessible to the extraction instrument.

Figure 10:
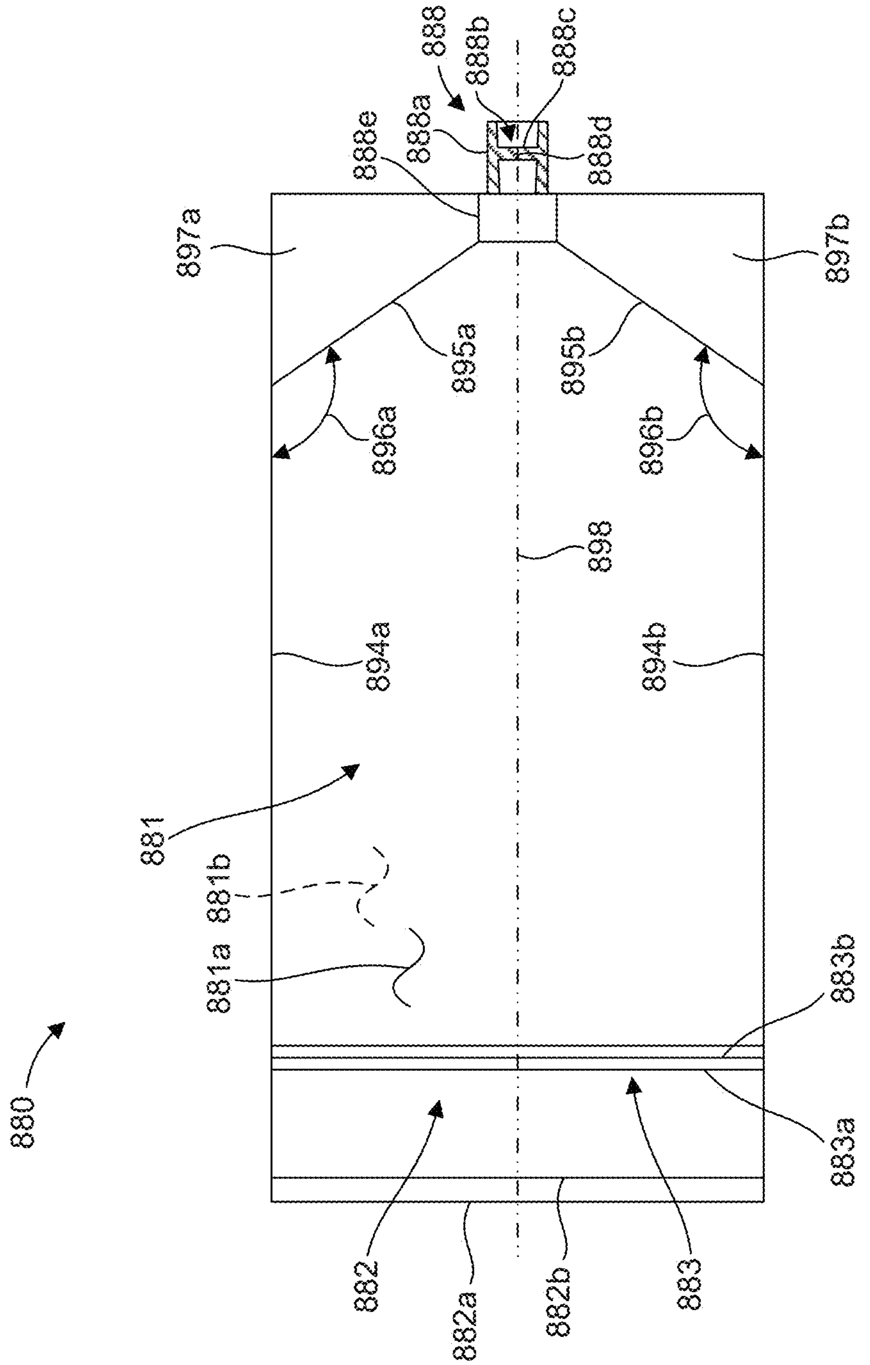
FIG. 10 is an example illustration of a pill pouch in accordance with another embodiment of the present disclosure.

FIG. 10 illustrates a pill pouch 880 in accordance with another example of the present disclosure. The pill pouch 880 is similar in many respects to the pill pouches discussed above. For example, the pill pouch 880 can include a receptacle 881 to contain a pill. The pill pouch 880 receptacle 881 can also have an opening 882 to receive the pill prior to being crushed and/or broken up into small fragments or powder. In addition, the pill pouch 880 can include an access feature 888 associated with the receptacle 881 to facilitate removal of the pill from the receptacle after the pill has been broken and/or crushed.

A closure or sealing mechanism 883 can be operable to alternately close or seal the opening 882 and provide access to the receptacle 881 through the opening 882. In one aspect, the closure or sealing mechanism 883 can have a groove 883*a* and ridge 883*b* configured to releasably interlock with one another. The groove 883*a* and ridge 883*b* can be similar to those of the closure or sealing mechanisms commonly utilized with resealable zipper bags, such as Ziploc® bags. Any suitable number of grooves and ridges can be utilized in any suitable combination. Flaps 882*a*, 882*b* can be included to facilitate accessing the opening 882, such as by providing gripping surfaces for a user to open the closure or sealing mechanism 883, such as by pulling the flaps 882*a*, 882*b* apart or away from one another. In one aspect, the opening 882 can be sealed, such as with heat, to form a temporary or permanent seal.

The receptacle 881 can have any suitable configuration. For example, the receptacle 881 can have edges or surfaces configured to facilitate removal of a broken and/or crushed pill from the receptacle 881. In one aspect, the receptacle 881 can have adjacent edges 894*a*, 895*a* with an angle 896*a* greater than 90 degrees between the adjacent edges to facilitate removal of the pill from the receptacle 881 by guiding the pill toward the access feature 888, which can be intersected by the edge 895*a*. In addition, the receptacle 881 can have adjacent edges 894*b*, 895*b* with an angle 896*b* greater than 90 degrees between the adjacent edges to facilitate removal of the pill from the receptacle 881 by guiding the pill toward the access feature 888, which can be intersected by the edge 895*b*. Thus, in this case, the angled edges 895*a*, 895*b* can cooperate to guide or funnel a broken and/or crushed pill toward the access feature 888, although only a single angled edge or surface may suffice. It should be recognized that adjacent edges can intersect one another to form a "sharp" corner as illustrated in the figure, or such an intersection can form a "rounded" corner, as desired.

The receptacle 881 can be defined at least in part by one or more flexible sides 881*a*, 881*b* to facilitate breaking or crushing of the pill inside the receptacle 881. In one aspect, the flexible sides 881*a*, 881*b* can be opposite one another. The pill pouch 880 can be constructed of any suitable material to provide the one or more flexible sides 881*a*, 881*b*, such as any suitable plastic film (e.g., polyethylene) of any suitable thickness. The edges 894*a*, 894*b*, 895*a*, 895*b* can be formed by welding, such as hot sealing. Thus, portions 897*a*, 897*b* of the pill pouch 880 may be a remnant of the manufacturing process and can therefore be omitted from the pill pouch 880 if desired. In one aspect, the access feature 888 can be welded to the material forming the flexible sides 881*a*, 881*b*. The access feature 888 can include an access interface 888*a* configured to facilitate removal of a pill from the receptacle 881 using an extraction instrument (e.g., a syringe, a tube, a nozzle, a hypodermic needle, a hollow needle, etc.). The access interface 888*a* of the access feature can therefore comprise an interface structure of a luer connector, a hole, a port, a slit, a breakable membrane, etc. In one aspect, the access feature 888 can be positioned to facilitate removal of a pill from the receptacle 881 following crushing and/or rolling of the pill using an extraction instrument, such as a syringe, whether in a dry powdered form or as a liquid solution. In one aspect, the access feature 888 can include a valve 888*b* that can be in a normally closed configuration, which can be opened by an extraction instrument, such as when coupled to the access feature 888. The valve 888*b* can be formed by a membrane 888*c* having a slit 888*d* or other such opening. The membrane 888*c* can be configured to close the slit 888*d* or opening when not engaged with an extraction instrument, and to open or enlarge the slit or opening when penetrated by an extraction instrument. Thus, the valve 888*b* can maintain a seal for the pill pouch keeping pill materials from escaping the receptacle 881 while being broken and/or crushed. The valve 888*b* can also facilitate the removal of air from the receptacle prior to breaking and/or crushing a pill, as well as the removal of the pill from the receptacle once the pill has been broken and/or crushed.

In one aspect, the access feature 888 can include a human interface portion 888*e* that can be configured to facilitate grasping by a human for manipulating the pill pouch 880, such as during crushing and/or rolling of a pill. Accordingly, the human interface portion 888*e* can be located in any suitable position about the pill pouch 880 and relative to other elements of the access feature 888 to facilitate grasping by a human. The human interface portion 888*e* can also be of any suitable size to facilitate grasping by a human. In the example shown in FIG. 10, the human interface portion 888*e* can facilitate grasping by a user's index finger and thumb while at least a portion of an extraction instrument, such as a syringe, can be supported by the user's palm and/or other fingers while manipulating and maneuvering the pill pouch 880, such as when crushing and/or rolling a pill. In one aspect, the human interface portion 888*e* can include friction enhancing features (not shown), such as knurling, pebbling, texture, etc. to increase grip and reduce or minimize the likelihood of slippage when being grasped.

It should be recognized that the opening 882 and/or the access feature 888 can be located or disposed at any suitable location about the pill pouch 880 and/or relative to the receptacle 881. In one aspect, various features of the pill pouch 880 can be configured and/or located to facilitate effective operation of a pill preparation device as disclosed herein. For example, the closure or sealing mechanism 883 for the opening 882 and/or the access feature 888 can be located such that there will be no interference with the operation of a pill preparation device, such as with a roller as the roller is manipulated about a platen during use. In one aspect, the access feature 888 and the opening 882 (i.e., the closure or sealing mechanism 883) can be disposed at opposite ends of the receptacle 881, as shown in FIG. 10. Such placement of these features can provide space for a pill preparation device roller to operate in breaking and/or crushing a pill in the receptacle without interference. Thus, the pill pouch 880 closure or sealing mechanism 883 and/or access feature can be located about a side, an edge, and/or a periphery of the pill pouch 880 to facilitate proper operation of a pill preparation device during use, such as avoiding interference with or inhibiting the operation of a roller to break up a pill.

In one aspect, the access feature 888 can be oriented such that a longitudinal axis 898 of the access feature 888 extends parallel to one or both of the flexible sides 881*a*, 881*b*, as in FIG. 10. In this case, the longitudinal axis 898 of the access feature 888 can coincide with a longitudinal axis of the receptacle 881 or of the pill pouch 880. In another aspect, the access feature 888 can be oriented such that the longitudinal axis 898 of the access feature 888 extends through the receptacle 881 and the opening 882. Such orientations of the access feature 888 can facilitate a stable coupling of an extraction instrument (e.g., a syringe) with the pill pouch 880 such that a support surface, such as a table or a platen of a pill preparation device, can simultaneously support both the pill pouch 880 and the extraction instrument when coupled to one another. These orientations can also facilitate simultaneous grasping of the pill pouch 880, such as by the human interface portion 888*e*, and a coupled extraction instrument by a single hand of the user. The latter orientation, in particular, can also facilitate breaking and/or crushing a pill in the receptacle 881 with a pill preparation device while the extraction instrument is coupled to the pill pouch 880 by positioning the extraction instrument such that the extraction instrument will not interfere with operation of the pill preparation device.

Although not illustrated, the pill pouch 880 can optionally include one or more tabs disposed on sides of the receptacle, which can be configured to interface and/or couple with a pill preparation device, such as via a hole interfacing with pill pouch attachment features, as disclosed hereinabove.

Figure 11A:
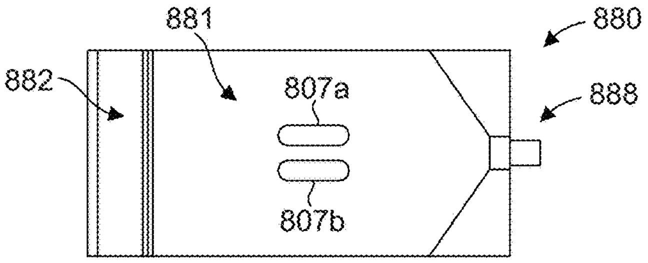
FIGS. 11A-11F illustrate the pill pouch of FIG. 10 in use, in accordance with an example of the present disclosure.
Figure 11B:
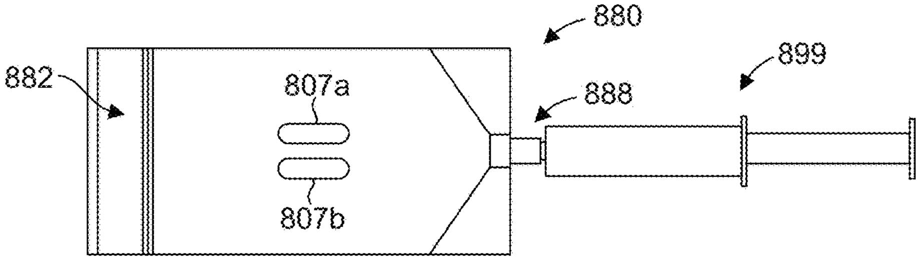
Figure 11C:
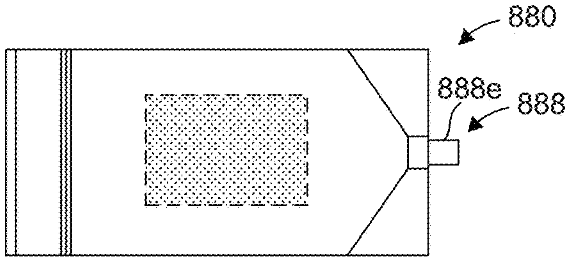
Figure 11D:
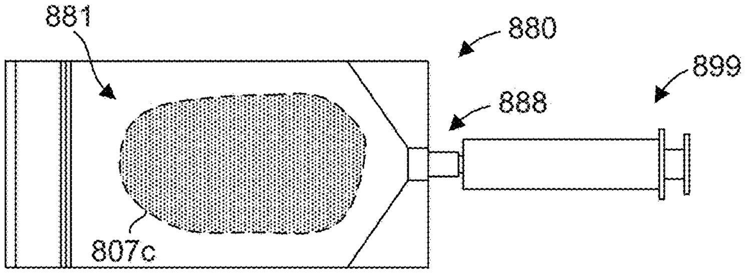
Figure 11E:
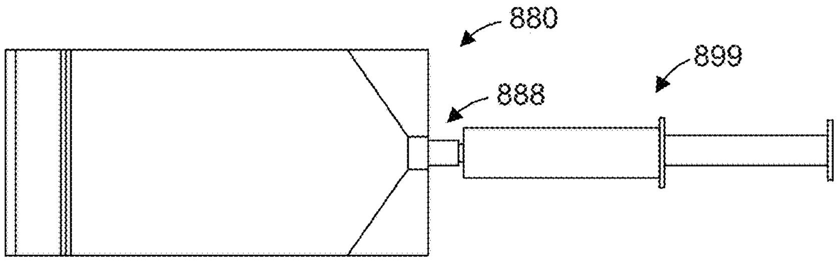
Figure 11F:
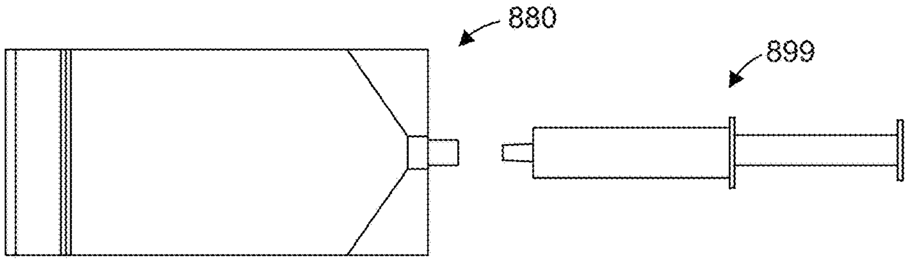

FIGS. 11A-11F illustrate the pill pouch of FIG. 10 in use in accordance with an example of the present disclosure. As illustrated in FIG. 11A, pills 807*a*, 807*b* can be deposited in the receptacle 881 of the pill pouch 880 via the opening 882. An extraction instrument 899, such as a syringe, can be coupled to the access feature 888, as shown in FIG. 11B. With the opening 882 closed, the extraction instrument 899 can remove air from the pill pouch 880 to prevent the pill pouch from rupturing due to the development of internal pressure while crushing and/or rolling the pills 807*a*, 807*b*. FIG. 11C illustrates the pills 807*a*, 807*b* as broken and/or crushed, such as by a pill preparation device of the present disclosure. As illustrated in FIG. 11C, the extraction instrument 899 was removed from the pill pouch 880 for breaking and/or crushing of the pills 807*a*, 807*b*. The valve (hidden from view) of the access feature 888 can maintain pill materials in the pill pouch 880 during crushing and/or rolling operations. It should be recognized, however, that the extraction instrument 899 may remain with the pill pouch 880 throughout a crushing and/or rolling process. The human interface portion 888*e* of the access feature 888 can facilitate manipulation and maneuvering of the pill pouch 880 during crushing and/or rolling of the pills 807*a*, 807*b*, with or without the extraction instrument 899 coupled to the access feature 888. As shown in FIG. 11D, after the pills 807*a*, 807*b* have been sufficiently crushed and/or rolled, a liquid can be introduced into the receptacle 881 via the access feature 888 using the extraction instrument 899, to form a liquid pill solution 807*c*, which may be facilitated by shaking the pill pouch 880 to mix the contents. Once the liquid pill solution 807*c* has been formed, the solution can be removed, withdrawn, or evacuated from the pill pouch 880 via the access feature 888 using the extraction instrument 899, as shown in FIG. 11E. As illustrated in FIG. 11F, with the liquid pill solution contained within the extraction instrument 899, the extraction instrument 899 can be removed from the pill pouch 880 and the liquid pill solution can be delivered directly to a patient from the extraction instrument 899, such as by depositing the solution from the extraction instrument 899 into a feeding tube. Although in this example a liquid was introduced to form a liquid pill solution for ease of extraction and delivery, it should be recognized that a pill can remain in a dry or powder state or condition for removal from the pill pouch 880. It should be recognized from the above description that the present disclosure provides a method for preparing a medication for a patient as well as a method for treating a patient with a medication.

In accordance with another embodiment of the present invention, a method for preparing a pill for administration to a subject is disclosed. The method can comprise disposing a pill in a receptacle of a pill pouch via an opening of the pill pouch. The method can also comprise at least one of breaking up the pill and crushing the pill. In addition, the method can comprise removing the pill from the receptacle via an access feature. In one aspect, the method can further comprise removing air from the receptacle. In another aspect, the method can further comprise adding a liquid to the receptacle to form a liquid pill solution. In a particular aspect of the method, removing the pill can comprise withdrawing the liquid pill solution with an extraction instrument.

It is noted that no specific order is required in the methods disclosed herein, though generally in one embodiment, method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A pill pouch system, comprising:

a pill;

a pill pouch including a receptacle containing the pill, the receptacle having an opening to receive the pill therein, a sealing mechanism operable to alternately seal the opening and provide access to the receptacle through the opening, and an access feature comprising a connector to facilitate removal of the pill from the receptacle after the pill has been at least one of broken and crushed; and an extraction instrument coupleable to the access feature to remove the pill from the receptacle;

wherein the access feature includes an access interface operable to interface with the extraction instrument and facilitate a closed system for removal of the pill from the receptacle using the extraction instrument.

2. The system of claim 1, wherein the extraction instrument comprises a syringe.

3. The system of claim 1, wherein the extraction instrument comprises a tube, a nozzle, a hypodermic needle, a hollow needle, or a combination thereof.

4. The system of claim 1, wherein the sealing mechanism comprises a groove and ridge configured to releasably interlock with one another.

* * * * *